March 10, 1953     E. FRISCH ET AL     2,631,262
MOTOR CONTROL SYSTEM
Filed March 24, 1948
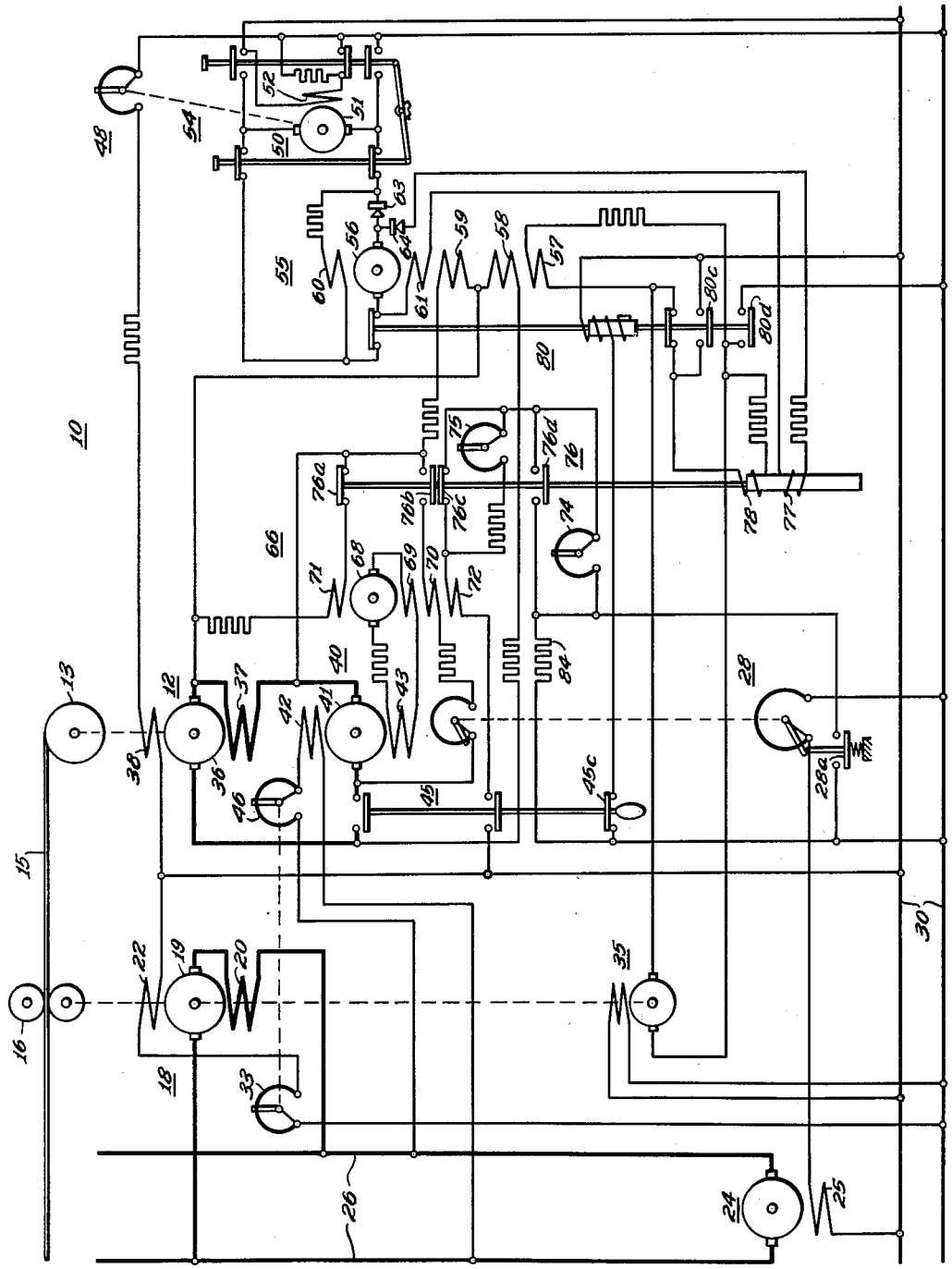
WITNESSES:
Robert C Baird
F. V. Giolma
INVENTORS
Erling Frisch and
William T. Hunt, Jr.
BY
L. W. Crawford
ATTORNEY Patented Mar. 10, 1953

2,631,262

UNITED STATES PATENT OFFICE 2,631,262

MOTOR CONTROL SYSTEM

Erling Frisch, Pittsburgh, Pa., and William T. Hunt, Jr., Williamsville, N. Y., assignors to Westinghouse Electric Corporation, East Pittsburgh, Pa., a corporation of Pennsylvania Application March 24, 1948, Serial No. 16,804

12 Claims. (Cl. 318—143)

Our invention relates generally to motor control systems, and it has reference in particular to a control system for a motor having driving connection with a winding reel for winding strip materials and the like.

Generally stated, it is an object of our invention to provide an improved control system for a reel motor, which is simple and inexpensive to manufacture, and which is reliable and effective in operation.

More specifically, it is an object of our invention to provide, in a reel motor control system, for transferring a regulating generator, which controls the energization of the reel motor, from a voltage regulator to a current regulator during a threading operation.

Another object of our invention is to provide, in a reel motor control system, for using a voltage relay for transferring the regulating generator for the reel motor from a current regulator to a voltage regulator and vice versa.

Another object of our invention is to provide, in a reel motor control system, for varying the pickup voltage of a regulator transfer relay in accordance with the speed of a strip material being wound on a reel.

It is also an object of our invention to provide, in a reel motor control system, for transferring a reel motor regulating generator from a current regulator to a voltage regulator at substantially the same percentage of overspeed for different values of strip speed.

It is an important object of our invention to provide, in a reel motor control system, for using a main regulating generator to control the operation of the reel motor generally, and for using a relay which is responsive to the voltage of an auxiliary regulating generator which controls the operation of a motor for actuating the field rheostat of the reel motor, to provide for transferring the main regulating generator from a current regulator to a voltage regulator.

Another important object of our invention is to provide, in a reel motor control system, for automatically obtaining a reduced value of pattern field on a reel motor regulating generator when the reel motor is operating at threading speed.

Yet another object of our invention is to provide a reliable and practical reel motor control system which is stable in operation over a wide range of operating speeds.

Other objects will in part be obvious, and will in part be explained hereinafter.

In practicing our invention in one of its forms the armature of a reel motor is energized under the control of a main regulating generator having a pattern field winding which is normally balanced by a current field winding energized in accordance with the armature current of the reel motor. The field winding of the reel motor is energized through a rheostat which is actuated by a motor operating under the control of an auxiliary regulating generator responsive to a differential between the strip speed and the counter-electromotive force of the reel motor. The main regulating generator is also provided with a voltage field winding. A voltage relay, which is responsive to reversal of the auxiliary regulating generator when the speed of the reel motor exceeds a definite operating value, changes the connections of the current and voltage field windings, and transfers the main regulating generator from a current regulator to a voltage regulator, so as to limit the speed of the reel motor during threading or when the strip breaks.

For a more complete understanding of the nature and scope of our invention, reference may be made to the following detailed description, which may be read in connection with the accompanying drawing, in which the single figure is a diagrammatic view of a reel motor control system embodying the invention in one of its forms, and shown in conjunction with the last stand of a strip mill.

Referring to the single figure of the drawing, the reference numeral 10 may denote, generally, a control system for a reel motor 12 shown as connected in driving relation with a reel 13, which is disposed to wind a strip material 15 being delivered by the last stand 16 of a strip mill or the like.

The mill stand 16 may be driven by means of a mill motor 18 having an armature 19, a series field winding 20, and a separately excited field winding 22. A main generator 24 having field winding 25 may be utilized to supply electric power to the mill motor through a main mill bus comprising conductors 26. The field winding 25 of the main generator 24 may be energized through a master switch or field rheostat 28 from a constant voltage source represented by bus conductors 30.

The speed of the mill stand 16 may be varied by operating the master switch 28, which functions to vary the speed of the entire mill. The field winding 22 of the mill motor 18 may be energized from bus conductors 30 through a field rheostat 33, which may be used to vary the speed of this motor individually. A pilot generator 35 may be arranged in driving relation with the mill motor 18 for providing a voltage proportional to the speed of the strip 15 as it passes through the mill stand 16.

The reel motor 12 may be provided with an armature 36, a series field winding 37 and a separately excited field winding 38. The reel motor may be supplied with electric power from a reel motor generator 40 having an armature 41, a main field winding 42 and a regulating field winding 43. The armature 41 of the reel motor generator may be connected in circuit relation with the armature 36 and series field winding 37 of the reel motor through suitable switch means represented by the manually-operated switch 45. The main field winding 42 of the generator 40 may be connected to the main mill bus conductors 26 through a field rheostat 46. The field rheostat 46 may be operatively connected with the field rheostat 33 of the mill motor 18, so that the speed of the reel motor 12 may be basically matched with the speed of the mill motor 18.

The field winding 38 of the reel motor 12 may be energized at a constant voltage from bus conductors 30 through a motor-operated rheostat 48 including an operating motor 50 having an armature 51 and a field winding 52. The field winding 52 may be connected to the constant voltage bus conductors 30, while the armature 51 may be selectively connected by means of a control switch 54, either to the bus conductors 30 for a reset operation, or to an auxiliary regulating generator 55 for compensating for coil build-up during a winding operation.

The auxiliary regulating generator 55 may comprise an armature 56, a pattern field winding 57, a voltage field winding 58, an IR drop compensating field winding 59, a main self-energizing field winding 60, and an auxiliary self-energizing field winding 61.

The pattern field winding 57 may be energized in accordance with the speed of the strip 15 from the pilot generator 35. The voltage field winding 58 may be connected across the armature 36 of the reel motor 12, while the IR drop compensating field winding 59 may be connected across the series field winding 37 thereof, so that the auxiliary regulating generator functions to vary the energization of the field winding 38 of the reel motor to maintain a substantially constant counter-electromotive force. The self-energizing field winding 60 may be connected across the armature 56 of the auxiliary regulating generator.

Rectifier means 63 may be connected in circuit relation with the armature 56 of the auxiliary regulating generator 55 and the armature 51 of the rheostat motor, so as to provide for operating the rheostat motor from the regulating generator 55 only in such a direction as to increase the energization of the reel motor field winding, and maintain a substantially constant counter-electromotive force as the speed of the reel motor decreases in accordance with the increasing diameter of the coil of the strip material being wound thereon. The auxiliary self-energizing field winding 61 may be connected across the armature 56 of the auxiliary regulating generator through a rectifier device 64, so that it is energized only when the voltage of the regulating generator 55 reverses in response to an overspeed condition of the reel motor.

In order to provide for regulating the operation of the reel motor 12 to maintain the desired strip tension, a main regulating generator 66 may be provided for energizing the regulating field winding 43 of the reel motor generator 40. The main regulating generator may comprise an armature 68, a self-energizing field winding 69, a voltage field winding 70, a current field winding 71, and a pattern field winding 72.

The pattern field winding 72 may be energized from the constant voltage bus conductors 30 through a tension adjusting rheostat 74, which determines the tension normally maintained in the strip 15 between the reel 13 and the mill stand 16. A threading speed rheostat 75 may be provided for controlling the pattern field winding 72 to determine the speed of the reel motor during a threading operation. The voltage field winding 70 may be connected across the armature 36 of the reel motor through a field rheostat 75 which may be operatively connected to the master switch 28. The current field winding 71 may be connected across the series field winding 37 of the reel motor, so as to be energized in accordance with the armature current of the reel motor.

In order to provide for operating the main regulating generator 66 as a voltage regulator during a threading operation, or if a strip should happen to break during a winding operation, and for operating the regulating generator as a current regulator during a normal winding operation, a transfer relay 76 may be provided, having an operating winding 77 and a calibrating winding 78. The operating winding 77 may be connected in series circuit relation with the auxiliary self-energizing field winding 61 of the auxiliary regulating generator 55, so as to effect operation of the relay when the speed of the reel motor increases more than a predetermined amount above a variable relation it normally maintains with the strip speed. The calibrating winding 78 may be normally connected across the pilot generator 35 so as to require a higher reversed output voltage of the auxiliary regulating generator 55 for operating the transfer relay when the mill is operating at higher speeds. The threading speed may thus be held to a predetermined percentage of the mill speed—for example, about 110% or 120%—regardless of the speed of the mill.

When the transfer relay 76 is in its deenergized position, it connects the current field winding 71 of the main regulating generator 66 across the series field winding 37 of the reel motor, and also provides a shunt connection around the threading speed rheostat 75. When the transfer relay is energized, it operates to disconnect the current field winding 71, and to connect the voltage field winding 70 of the main regulating generator across the armature of the reel motor so as to transfer the regulating generator 66 from a current regulator to a voltage regulator.

A timing relay 80 may be provided for interrupting the connection between the auxiliary regulating generator 55 and the rheostat motor armature 51 for a predetermined interval of time after the mill is started, so as to momentarily prevent operation of the reel motor rheostat 48 while the mill is coming up to speed. The timing relay also connects the calibrating winding 78 of the transfer relay 76 to the constant voltage bus 30 during starting of the mill, cumulatively with respect to the operating field winding 77, so as to provide for voltage regulating operation of the main regulating generator 66 to limit the speed of the reel motor while the mill is being brought up to speed.

When the mill is first started by closing the main switch 45, the timing relay 80 will be in the energized postion, since contact members 45c of the main switch 45 are closed in the disconnect or off postion, and will remain there for a predetermined interval of time after the main switch 45 is closed to connect the reel motor 12 to the reel motor generator 40. Since the strip is not initially threaded onto the reel 13, it is desirable to regulate the reel motor initially with the main regulating generator 66 operating as a voltage regulator. This result is produced initially, since the calibrating winding 78 of the transfer relay 76 is connected to the constant voltage bus conductors 30 through contact members 80c and 80d of the timing relay cumulatively with respect to the operating winding 77. The transfer relay operates immediately, and remains in the energized postion, since the timing relay is timed to drop out only after the reel motor has attained a speed sufficient to cause the auxiliary regulating generator 55 to develop sufficient voltage to maintain the relay in the operated position. When the timing relay returns to the deenergized position, the rheostat motor armature 51 is connected to the auxiliary regulating generator 55 and the calibrating winding 78 of the transfer relay is connected to the pilot generator 35.

As soon as the reel motor 12 reaches an operating speed of approximately 110% or 120% of the operating speed of the mill, the ampere turns produced by the voltage field winding 70 of the main regulating generator 66 balance those of the pattern field winding 72. The regulating generator 66 thereupon operates to maintain the reel motor in this speed relationship with the mill stand in preparation for a threading operation. The exact speed relation may be varied by adjusting the threading speed rheostat 75 to vary the pattern field of the main regulating generator.

As soon as the strip is threaded onto the reel, the reel motor slows down. This decreases the energization of the voltage field winding 58 of the auxiliary regulating generator 55, so that the field produced by the pattern field winding 57 predominates, and the voltage output reverses, so that the operating winding 77 of the transfer relay 76 will be deenergized. The transfer relay returns to the deenergized position and main regulating generator 66 is thereupon transferred to a current regulator, with the current field winding 71 connected across the series field winding 37 of the reel motor through contact member 76a.

The main regulating generator 66 thereupon operates to regulate the voltage applied to the armature 36 of the reel motor so as to maintain a predetermined value of armature current. This value may be determined by the energization of the pattern field winding 72 which is dependent upon the operating position of the tension rheostat 74, since the transfer relay now shunts the threading speed rheostat 75 at contact member 76c, and opens contact members 76d to connect the rheostat 74 in circuit relation with the pattern field winding 72.

As the strip 15 is wound onto the reel 13, the diameter of the coil on the reel gradually increases, and the reel motor gradually slows down. This reduces the energization of the voltage field winding 58 of the auxiliary regulating generator 55, so that the pattern field winding 57 which is energized from the pilot generator 35 produces an output voltage across the armature 56 of the auxiliary regulating generator in such a direction as to cause a current to flow through the rectifier device 63 and the armature 51 of the rheostat motor 50. The rheostat 48 is thereby actuated to increase the energization of the field winding 38 of the reel motor so as to restore the counter-electromotive force of the reel motor 12 to its normal value, despite the reduction in speed. This action continues throughout the winding operation.

Should the strip 15 break during a winding operation, the main regulating generator 66 will attempt to speed up the reel motor. The counter-electromotive force of the reel motor increases, and the output voltage of the auxiliary regulating generator 55 thereupon reverses and the transfer relay 76 is operated. The voltage winding 70 of the main regulating generator is reconnected through contact members 76b, so that it now operates as a voltage regulator to limit the speed of the reel motor. At the same time the tension rheostat 74 is shunted and the threading speed rheostat 75 is connected in circuit relation with the pattern field winding 72, so as to determine the threading speed of the reel motor.

When the mill is stalled by returning the master switch 28 to the minimum position in which only a reduced voltage is applied to the mill motor, limit switch 28a will be actuated to insert a stalled tension resistor 84, in circuit relation with the pattern field winding 72, so that the main regulating generator 66 operates to maintain a reduced value of the strip tension under stalled conditions.

From the above description and the accompanying drawing it will be apparent that we have provided in a simple and effective manner for controlling the operation of a reel motor and transferring it from current to voltage responsive conditions and vice versa. By using a voltage relay responsive to predetermined voltage conditions of the auxiliary regulating generator controlling the operation of the rheostat motor, a simple and effective control system is provided. By utilizing a calibrating winding on the transfer relay, the transfer from a current to voltage regulating operation may be made at the same percentage overspeed, regardless of the actual speed of the mill. By utilizing a self-energized field winding connected in circuit relation with the relay operating winding the pickup point of the transfer relay may be easily adjusted, even for relatively low values of mill speeds, by varying the impedance of the relay circuit.

Since certain changes may be made in the above-described construction, and different embodiments of the invention may be made without departing from the spirit or scope thereof, it is intended that all the matter contained in the above description and shown in the accompanying drawing, shall be considered as illustrative, and not in a limiting sense.

What is claimed is:

1. A control system for a motor having an armature and field excitation means comprising, a main regulating generator controlling the supply of electrical energy to the motor, an auxiliary regulating generator controlling the field excitation means of the motor, and control means responsive to the operation of the auxiliary regulating generator connected to control the operation of the main regulating generator.

2. In a control system for a motor having an armature and field excitation means, a main regulating generator connected to control the energization of the motor armature, an auxiliary regulating generator responsive to a differential between the counter-electromotive force of the motor and a reference quantity connected to control the energization of the motor field excitation means, and control means selectively operable in response to a predetermined voltage condition of the auxiliary regulating generator to control the main regulating generator in accordance with either the armature current or voltage of the motor.

3. A control system for a motor having an armature and field excitation means comprising, a main regulating generator for controlling the energization of the motor armature, an additional regulating generator for controlling the energization of the field excitation means, control means responsive to the output voltage of the additional regulating generator connected to control the main regulating generator, and circuit means effective to vary the response of the control means in accordance with predetermined speed conditions.

4. A control system for a motor having an armature and field excitation means comprising, circuit means for supplying electrical energy to the armature, control means operable to modify the supply of electrical energy to the armature in accordance with a predetermined speed condition, regulating means operable to control the supply of electrical energy to the field excitation means to maintain the counter-electromotive force of the motor substantially constant for a given speed condition, and relay means selectively responsive to the output voltage of the regulating means connected to effect operation of the control means in response to either the motor armature current or the armature voltage.

5. In a control system for a motor having an armature and a field winding, variable voltage means connected to supply electrical energy to the armature including a main regulating generator having control windings disposed to be energized in accordance with the armature current and voltage of the motor, circuit means including a motor-operated rheostat connected to energize the motor field winding, an auxiliary regulating generator operable in response to a deviation between a predetermined speed relation of the motor and a predetermined speed condition to effect operation of the rheostat motor to maintain the counter-electromotive force of the motor substantially constant, and relay means responsive to the operation of the auxiliary regulating generator to disconnect one or the other of the control windings of the main regulating generator.

6. A control system for a motor having an armature and a field winding comprising, a generator connected to energize the armature, said generator having a main field winding energized in accordance with a predetermined speed condition and being also provided with an auxiliary field winding, a regulating generator connected to effect energization of the auxiliary field winding, said regulating generator having a pattern field winding and control field windings disposed to be connected for energization in accordance with the armature current and voltage of the motor, control means operable in response to a predetermined departure from a predetermined variable relationship between the speed of the motor and the predetermined speed condition to effect connection of the voltage responsive control winding and disconnection of the current responsive control winding.

7. In a control system for a motor having an armature and a field winding, circuit means energizing the armature including a main regulating generator having control field windings disposed to be energized in accordance with the armature current and voltage of the motor and a pattern field winding, circuit means connecting the pattern field winding to a source of control voltage including a plurality of resistance means, and control means responsive to a predetermined deviation from a definite variable relationship between the speed of the motor and an adjacent work device to effect connection of the voltage control winding and disconnection of the current control winding, said control means being also operable to change the connection of the resistance means to vary the energization of the pattern field winding.

8. In a control system for a motor having an armature and a field winding, a generator connected to supply electrical energy to the armature, said generator being provided with main and auxiliary field windings, circuit means connected to energize the main field winding including rheostat means operatively connected to speed control means for determining a predetermined speed condition, a regulating generator connected to energize the auxiliary field winding, said generator being provided with a plurality of field windings including control field windings disposed to be energized in accordance with the armature current and voltage of the motor and a pattern field winding, tension rheostat means connected in circuit relation with the pattern field winding, additional rheostat means connected in circuit relation with the pattern field winding effective to determine the speed of the motor under one set of operating conditions, and relay means normally connecting the current responsive control winding and the tension rheostat means in operating circuit relation, said relay being responsive upon a predetermined excess in speed of the motor relative to the predetermined speed condition under given operating conditions to disconnect the current responsive control winding and the tension rheostat, and connect the voltage responsive control winding and the additional rheostat in operating circuit relation.

9. The combination in a control system for a motor having an armature and a field winding, of a regulating generator controlling the supply of electrical energy to the armature of the motor, said regulating generator having field excitation means responsive to the armature current of the motor and the armature voltage thereof, a motor operated rheostat connected in circuit relation with the field winding of the motor, an auxiliary regulating generator responsive to a differential between a reference voltage proportional to a speed condition having a predetermined variable relation to the speed of the motor and the counter-electromotive force of the motor in one sense to effect operation of the motor-operated rheostat to reduce said differential, and relay means responsive to a differential between said quantities in the opposite sense to control the connection of the current and voltage responsive field excitation means.

10. In a control system for a motor having an input circuit, regulating means for controlling the supply of electrical energy to the input circuit, control means normally connecting the regulating means to the input circuit to regulate for a predetermined value of current, and circuit means for effecting operation of the control means in response to a predetermined change in the counter e. m. f. of the motor with respect to a given reference value to change the connection of the regulating means to regulate for a predetermined value of voltage.

11. In a control system for a dynamo-electric machine, regulating means for controlling the transfer of electrical energy between the dynamo-electric machine and a circuit connected thereto, control means for connecting the regulating means to said circuit to maintain the current thereof at a predetermined value, and circuit means for effecting operation of the control means to change the connection of the regulating means to the circuit and regulate the voltage of the circuit in response to a predetermined change in the relation of the speed of the dynamo-electric machine to a given reference value.

12. In a control system for a motor having an armature and a field winding, circuit means connecting the field winding to a source of electrical energy, a regulating generator connected to energize the armature in accordance with a predetermined normal relation between the speed of the motor and a reference value, said regulating generator having an armature and a field winding for supplying the air gap magnetomotive losses for normal operation, circuit means connecting said field winding of the regulating generator in circuit with the armature thereof including a rectifier device connected to permit energization of said winding during normal operation, only, an additional field winding on said regulating generator for supplying less than the air gap magnetomotive losses, and circuit means connecting said additional field winding in circuit with the armature of the regulating generator including a rectifier device connected to permit energization of said additional winding only when the predetermined relation of the motor speed and the reference value is reversed from normal.

ERLING FRISCH.
WILLIAM T. HUNT, Jr.

REFERENCES CITED

The following references are of record in the file of this patent:

UNITED STATES PATENTS

| Number | Name | Date |
|---|---|---|
| 2,237,985 | Garman | Apr. 8, 1941 |
| 2,264,277 | Cook | Dec. 2, 1941 |
| 2,339,939 | Michel | Jan. 25, 1944 |
| 2,342,790 | Cook | Feb. 29, 1944 |
| 2,437,973 | Schmitz | Mar. 16, 1948 |
| 2,444,248 | Crever | June 29, 1948 |
| 2,447,654 | Kenyon | Aug. 24, 1948 |
| 2,451,901 | Auburn | Oct. 19, 1948 |